May 19, 1931. W. H. VREELAND 1,805,535
HOLLOW CASING SPEAR
Filed June 23, 1930
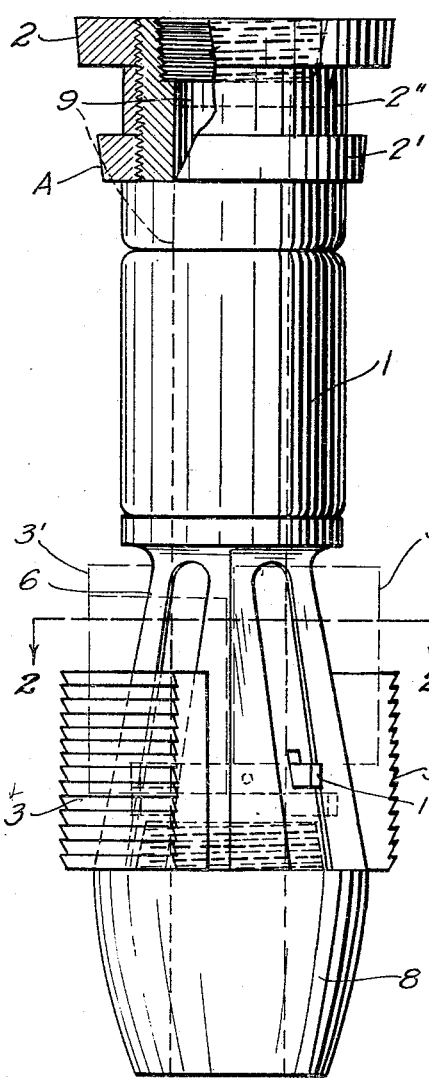
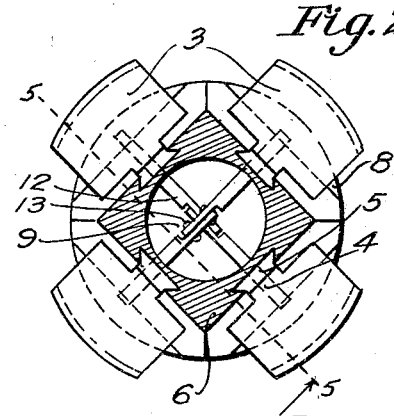
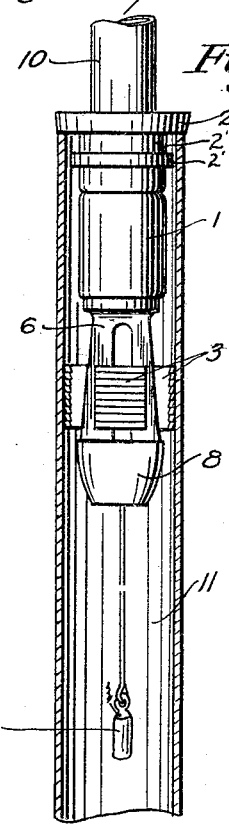
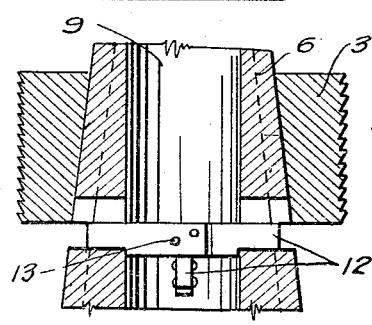
Inventor
William H. Vreeland
by U. G. Chaslee
Attorney Patented May 19, 1931

1,805,535

UNITED STATES PATENT OFFICE

WILLIAM H. VREELAND, OF AUGUSTA, KANSAS

HOLLOW CASING SPEAR

Application filed June 27, 1930. Serial No. 463,162.

My invention relates to a hollow casing spear for oil wells.

The object of my invention is to provide a casing spear that is hollow, by which means access may be had to the casing of an oil well below the spear for the purpose of inserting and discharging an explosive element, also stops controlling engagement of the slips.

A further object of my invention is to provide a hollow casing spear having interchangeable toothed slips on the lower end thereof, by which means casings of different diameters may be engaged with equal efficiency.

A still further object of my invention is to provide a casing spear such as known in the oil fields as the "bull dog" type, the spear being hollow and having a removable ring element on the upper end thereof functioning as a stop, by which means (should the pendent supporting means become severed while drawing a casing) the spear will be supported by the ring resting on the upper end of the casing, thereby avoiding the loss of the spear which otherwise would descend to the bottom of the well.

These and other objects will hereinafter be more fully explained, reference being had to the accompanying drawings forming a part of this specification, in which like characters apply to like parts in the different views.

Referring to the drawings,

Fig. 1 is a side elevation of the hollow casing spear showing with dotted lines the longitudinal aperture therethru, and having one of the slips removed for convenience of illustration.

Fig. 2 is a sectional view taken on line 2—2 in Fig. 1.

Fig. 3 is a side view of one of the slips which serve as clutching devices and enable the spear to firmly grasp the casing which is to be drawn from the well.

Fig. 4 is a side elevation of the casing in section, the hollow casing spear resting thereon, in position to remove said casing.

Fig. 5 is a sectional view taken on line 5—5 in Fig. 2.

My invention herein disclosed consists of a shaft 1 serving as a connecting means between rings 2, 2', and 2'' threadedly engaging on the upper end thereof, and a plurality of slidable toothed elements 3 as hereinafter described, at the lower end thereof, said shaft being composed of various conventional threaded pipe fittings, of sufficient length to properly space the aforesaid rings and slidable elements. Said slidable elements 3, which I shall call slips, are of wedge shape as shown in Fig. 3, with a trapezoidal tongue 4 on the rear side thereof adapted to slidably engage in a groove 5 in each of the sides of a pyramidal block 6 forming a dovetail joint, the wedge shape of the slips and the sloping faces to remain substantially in parallelism with the axis of the shaft, but to move inwardly and outwardly with respect to the longitudinal axis as the slips move up and down in their respective grooves 5. Dotted lines 3' show the slips at their upper extremity, and show the inward movement of the outer faces thereof. Said faces of the slips are of segmental form with a plurality of horizontal rows of upwardly projecting teeth 7 thereon.

As a means to easily replace or exchange the slips, I have arranged a frusto-conical nose 8 to threadedly engage with block 6, and to act as a retainer for the slips when they are in operative position. By simply unscrewing the nose member, the slips may be removed or replaced by a set suitable to conform to a different size casing. Likewise, ring 2 may be unscrewed and replaced by another which will adapt this part of the spear to various sizes of well casing. To avoid engagement of the slips with the casing, the same are supported upwardly as shown by the dotted lines 3, thru the medium of a pair of jointed detents composed of arms 12 rigidly connected by means of a plurality of rivets 13, said detents diametrically positioned to support the oppositely positioned slips 3 respectively, by which means the spear may be withdrawn from the casing, should it be advisable to do so prior to an attempt to draw the same, and to cause engagement of the slips which are the connecting medium. A weight suspended by a cable is lowered thru the hollow and allowed to drop with violent force, with the object of shearing the rivets 13 and breaking the detents which are then free to drop downward allowing the said slips to slide downward to snug engagement with the inside of the casing by the expansion caused by the shape of the block hereinafter described. It will be understood that by reason of the ring elements on the upper end of the shaft, the spear is stopped thereby as it rests on the upper end of the casing.

It will be noted that an aperture 9 extends longitudinally the entire length of the spear. Referring again to the ring elements, it will be understood that rings 2 and 2' are of different diameters externally and are separated by a ring element 2" all of which threadedly engage on a reduced portion on the upper end of the shaft as shown in Fig. 1. The lower ring 2' has its outer corners slightly bevelled as at A to assist the said ring in passing into a casing that will engage with the ring 2 as shown in Fig. 4. The ring 2' will function as a stop for the spear when the casing that is to be withdrawn is slightly larger than the shaft thereof and having both rings attached as shown in Figs. 1 and 4 to accommodate for two sizes of casings at a time. The extreme small sizes of casings are illustrated in the drawings. When the larger casings are being drawn larger rings proportionally will be applied to the spear.

Suppose a section of well casing has been lost or broken off within a well. My device may be lowered from the surface by a pendent supporting means 10 composed of joints of casing threadedly engaging in the upper end of the shaft 1. The conical nose, and upwardly projecting teeth of the slips will allow the spear to enter the upper end of the casing until the ring, which is of proper size to prevent its further movement, will rest upon the end of the casing. When upward force is applied by the pendent supporting means, the slips will (when the detents are broken) cause the teeth 7 to clutch into the walls of the casing, which may thereby be hoisted to the surface. When the casing is jammed or imbedded so tightly that it cannot be removed by this means, an explosive charge B may be lowered thru the hollow casing spear to a point below the same, and be discharged as a means of breaking the casing for the removal of the upper portion thereof.

Although I have shown and described certain details of arrangement of my device, I do not wish to be so confined, as various modifications may be employed as lie within the scope of the appended claims, and having fully described my invention what I claim as new and desire to secure by Letters Patent is:—

1. In a hollow casing spear of the class described comprising an apertured pyramidal block and slips slidably engaging thereon, the apertures being diametrically positioned, a jointed detent, the outer ends of which extend thru their respective apertures and on which their respective slips will rest as disengaging means therefor, means to break the detents to release the slips for engagement, the said means operating in the hollow of the spear.

2. In a hollow casing spear of the class described comprising a shaft and a plurality of rings threadedly engaging on the upper end of the shaft, and a pyramidal block on the lower end of the shaft, the block having toothed slips engaging thereon, and a removable nose threadedly engaging on the lower end of the pyramidal block as a stop for the extreme downward movement of the slips, a pair of jointed detents diametrically extending thru the pyramidal block and being transversely positioned to each other, by which means the toothed slips are retained in their extreme upward movement, and released when the detents are removed by breaking the same, substantially as described.

3. In a hollow casing spear of the class described comprising a shaft with a reduced threaded portion on the upper end thereof, and a pyramidal portion on the lower end thereof, and a toothed slip to slidably engage on each side of the pyramid, and a frustoconical nose threadedly engaging with the lower end of the pyramidal portion, the pyramidal portion having two pairs of openings diametrically positioned and each pair in alignment, a jointed detent to engage in each pair of the openings so that the outer ends thereof protrude as carrying means for the upper position of the slips, a ring with a peripherally beveled face, a second ring of a greater diameter than the first said ring, a third ring as a spacer between the first said rings, all threadedly engaging on the upper end of the shaft, for the purpose specified.

In testimony whereof I affix my signature.

WILLIAM H. VREELAND.